United States Patent
Ramel et al.

(10) Patent No.: US 7,394,986 B2
(45) Date of Patent: Jul. 1, 2008

(54) FLAT TOP OPTICAL FILTERING COMPONENT

(75) Inventors: Romain Ramel, Saint Egreve (FR); Sylvie Jarjayes, Grenoble (FR); Stéphane Gluck, Le Pont de Claix (FR)

(73) Assignee: Atmel Grenoble S. A. (FR)

( * ) Notice: Subject to any disclaimer, the term of this patent is extended or adjusted under 35 U.S.C. 154(b) by 453 days.

(21) Appl. No.: 10/525,416

(22) PCT Filed: Sep. 9, 2003

(86) PCT No.: PCT/FR03/02678

§ 371 (c)(1),
(2), (4) Date: Feb. 23, 2005

(87) PCT Pub. No.: WO2004/025336

PCT Pub. Date: Mar. 25, 2004

(65) Prior Publication Data

US 2006/0120663 A1    Jun. 8, 2006

(30) Foreign Application Priority Data

Sep. 13, 2002   (FR) .................................. 02 11393

(51) Int. Cl.
*H04J 14/02* (2006.01)
(52) U.S. Cl. .............. 398/85; 398/79; 398/82; 398/83; 398/84; 398/86; 398/87; 398/88; 398/42; 398/43; 398/147; 398/149; 398/158; 398/159; 385/24; 385/37; 385/39; 385/27; 385/14; 385/15; 385/31; 385/33; 385/34; 385/47; 359/577; 359/589; 359/590; 359/587; 359/260; 359/580; 359/583; 359/633; 359/634; 372/20; 372/98; 372/99; 372/43

(58) Field of Classification Search ............... 398/82, 398/85, 79, 88, 86, 147, 148, 149, 158, 159, 398/43, 83, 84, 87, 42; 385/24, 27, 37, 33, 385/31, 34, 14, 15, 39, 47; 359/589, 587, 359/583, 580, 633, 634, 590, 577, 260; 372/20, 372/98, 99, 43
See application file for complete search history.

(56) References Cited

U.S. PATENT DOCUMENTS 5,283,845 A * 2/1994 Ip .............................. 385/24

(Continued)

FOREIGN PATENT DOCUMENTS

EP        0855607 A      7/1998

(Continued)

OTHER PUBLICATIONS

Tsuda H et al: "Polarisation independent tunable liquid-crystal Fabry-Perot interferometer filter module with double-pass configuration", May 11, 1995 Electronics letters, IEE Stevenage, GB vol. 31, No. 10.

(Continued)

*Primary Examiner*—Hanh Phan
(74) *Attorney, Agent, or Firm*—Lowe Hauptman Ham & Berner, LLP

(57) ABSTRACT

The invention relates to wavelength-selective optical filters for allowing light of a narrow optical spectral band, centered around a wavelength ($\lambda_c$) to pass through them, while reflecting the wavelengths lying outside this band. According to the invention, the transfer function ($T_{1,2}(\lambda)$) of the component is defined by multiplying two transfer functions of spectrally offset Fabry-Perot filters.

7 Claims, 3 Drawing Sheets

U.S. PATENT DOCUMENTS

| | | |
|---|---|---|
| 5,815,497 A | 9/1998 | Ramel |
| 5,850,390 A | 12/1998 | Ramel et al. |
| 5,864,577 A | 1/1999 | Ramel |
| 6,241,397 B1 * | 6/2001 | Bao et al. .................... 385/73 |
| 6,625,174 B1 | 9/2003 | Hethuin et al. |
| 6,700,706 B2 * | 3/2004 | Chang et al. ............... 359/577 |

FOREIGN PATENT DOCUMENTS

| | | |
|---|---|---|
| EP | 0855607 A2 | 7/1998 |
| EP | 0 874 489 A | 10/1998 |
| EP | 0874489 A2 | 10/1998 |
| EP | 0903615 A | 3/1999 |
| EP | 0903615 A2 | 3/1999 |
| EP | 1 128 197 A | 8/2001 |
| EP | 1128197 A2 | 8/2001 |
| FR | 2 820 513 A | 8/2002 |
| FR | 2820513 | 8/2002 |

OTHER PUBLICATIONS

Lamperski J.: "Discretely tunable multi cavity FFP filter for standard WDM frequency grid" 2000 proceddings of the electronic components, and technology conference, New York, NY May 21, 2000.

Saleh A A M et al: "Two-Stage Fabry-Perot Filters as demultiplexers in optical FDMA Lan's" Journal of Lightwave Technology, IEEE. New York, US Feb. 1, 1989.

* cited by examiner

FLAT TOP OPTICAL FILTERING COMPONENT

CROSS-REFERENCE TO RELATED APPLICATIONS

The present Application is based on International Application No. PCT/FR2003/002678, filed on Sep. 9, 2003, which in turn corresponds to FR 02/11393 filed on Sep. 13, 2002, and priority is hereby claimed under 35 USC §119 based on these applications. Each of these applications are hereby incorporated by reference in their entirety into the present application.

BACKGROUND OF THE INVENTION

1. Field of the Invention

The invention relates to wavelength-selective optical filters that allow light of a narrow optical spectral band, centered around one wavelength, to pass through them while reflecting the wavelengths lying outside this band. Provision may be made for the central wavelength of the narrow spectral band to be adjusted by electrical means.

2. Background of the Invention

The word "light" is understood in the broad sense and in particular includes spectral bands in the infrared, as will be seen below, one main application of the invention being the filtering of light in the various fiber-optic telecommunications bands lying between 1.3 and 1.61 microns.

The advantage of these bands between 1.3 and 1.61 microns results from the fact that current optical fibers, made of glass, used in telecommunications networks have a low attenuation and the optical signals may therefore be transmitted over very great distances. In what follows, the invention will be explained with regard to this spectral band, it being understood that the invention can be transposed to other bands if the need to do so arises, using the materials suitable for these different bands. It is also understood that the invention is not limited to the telecommunications field, rather it may be employed in any field in which spectral analysis is required, such as for example in the petrochemical industry (as a hydrocarbon detector) or in the biological field (in blood analysis).

In a fiber-optic telecommunications network, a cable comprising several optical fibers may be used to produce several different transmission channels. It is also possible to carry out time-division multiplexing of the data in order to achieve the same result. However, the current trend, for a further increase in the data rate capacity of the network, is to transmit simultaneously, on the same optical fiber, several light wavelengths modulated independently of one another, each defining one data channel. The ITU (International Telecommunications Union) Standard 692 proposes to define adjacent channels with a 100 GHz optical spectral bandwidth that are centered on N adjacent normalized optical frequencies, the values of which are 200 terahertz, 199.9 terahertz, 199.8 terahertz, etc., corresponding to N wavelengths ranging from 1.52 microns up to 1.61 microns. In a channel with this bandwidth, it is possible to carry out light modulation at 10 to 40 gigabits per second without an excessive risk of interference with the channels of immediately adjacent spectral bands (using Gaussian modulation pulses to minimize the bandwidth occupied by this modulation). This frequency-division multiplexing technique is also called DWDM (Dense Wavelength Division Multiplexing).

In a telecommunications network, the problem is therefore to be able to collect the light corresponding to a given channel without disturbing the light in the neighboring channels. For example, at a transmission node of the network, assigned to transmitting data into channel i and for receiving data therefrom, it is necessary to be able to collect the light at a central frequency $F_i$ (wavelength $\Box_i$) without disturbing the transmission of the light modulating the central frequencies $F_1$ to $F_N$, although these optical frequencies are very close together.

To do this, there is a need to produce highly light-wavelength-selective optical filtering components capable of letting the central optical frequency $F_i$ and the frequencies located within a narrow band of less than 50 GHz on either side of this frequency pass through them, while blocking the other bands. At the output of such a filter, only the light from channel i is collected and this can be demodulated in order to collect the useful data or to send it to another branch of the network.

More precisely, in order for it to be used in an optical telecommunications network, a filtering component must satisfy two major criteria:

a maximum modulation within a channel, which modulation must in practice be at most of the order of 0.5 dB. This modulation, well known in the literature as being called a "ripple", is the maximum variation of the signal output by the filtering component over the spectral band of the channel in question; and a minimum isolation between two adjacent channels, which in practice must be at least of the order of 20 dB. The isolation is defined as being the difference measured between the minimum amplitude of the signal output by the filtering component in the channel in question and the maximum amplitude in an adjacent channel.

It has already been proposed to produce filtering components operating on the principle of Fabry-Perot interferometers produced by depositing semiconductor layers separated from each other by air gaps having thicknesses that are calibrated with respect to the wavelength $\Box_i$ to be selected. In practice, an interferometer comprises two mirrors consisting of superposed dielectric layers (Bragg mirrors), of high reflection coefficient, which are separated by a transparent plate of optical thickness $k\Box_i/2$ (actual thickness $k\Box_i/2$ if the plate is an air gap) where k is an integer defining the order of the interferometric filter. The mirrors, together with the space that separates them are called a cavity. Indiumphosphide (InP) is very suitable for these embodiments, in particular because of its transparency at the wavelengths in question, its very high refractive index, the possibility of growing layers of well-controlled thickness, and the possibility of using the technique of selective micromachining between InP layers and InGaAs layers.

If the layer thicknesses and the gaps between layers are very well controlled and if the materials have a large refractive index difference, such a filter proves to be highly selective with few layers or InP/air alternations.

Such a construction is described in the article by A. Spisser et al., entitled "*Highly Selective* 1.55 *micrometer InP/airgap micromachined Fabry-Perot filter for optical communications*" in Electronics Letters, N° 34(5), pages 453-454, 1998. Other constructions have been proposed, made of micromachined silicon and of alloys based on gallium arsenide.

An intrinsic limitation occurs when a simple Fabry-Perot interferometer is used as a filtering component. Such a component does not make it possible to achieve, simultaneously, minimum ripple in a channel and sufficient isolation between two adjacent channels for use in an optical telecommunications network using a DWDM type multiplexing technique. This limitation will be better understood from FIG. 1 in which two mirrors a and b, having respective reflectivities $R_a$ and $R_b$, define a Fabry-Perot cavity. The two mirrors a and b are separated from each other by a distance d. A light ray penetrates the filtering component at an angle of incidence θ. To simplify the reasoning, the mirrors a and b are considered to be infinite. In the particular case of a symmetrical cavity ($R_a=R_b=R$), the parameters λ and θ represent the wavelength and the angle of incidence, respectively, of the radiation in the cavity. The transmission curve T(λ) as a function of its wavelength λ is an Airy function and can be written as:

$$T_1(\lambda) = \frac{1}{1 + M\sin^2\left(\frac{2\pi n d \cos\theta}{\lambda}\right)} \quad (1)$$

where $$M = \frac{4R}{(1-R)^2},$$

and where n is the optical index of the cavity medium.

We will now consider an air cavity so as not to encumber the notations. Of course, the invention is not limited to an air cavity, and any optical material of index n different from 1 may be used.

When the resonance condition is fulfilled, that is to say for a wavelength $\lambda_p$ such that d cos θ=$\lambda_p$/2 (p being an integer representing the interference order), the transmission is a maximum and equal to 100%.

In the case of a Fabry-Perot cavity used as filter, the order may be kept fixed. This makes it possible to obtain a wavelength-tunability range bounded by the interval that separates two consecutive transmission peaks, this being called the free spectral interval (FSI). Tunability is achieved by varying the length d of the cavity.

To illustrate the limitations of a simple Fabry-Perot cavity, the following numerical example is chosen:
wavelength λ at normal incidence (θ=0): $\lambda_0$=1550 nm;
interference order: p=4;
cavity length $d_0$=2$\lambda_0$=2×1550 nm;
R=99.6%.

The aim is to obtain a filter for optical telecommunications with channels spaced apart by 100 GHz and a data rate of 10 Gb/s corresponding to a channel bandwidth of 0.2 nm (25 GHz) as described in the above paragraph.

The shape of the spectral response of the filter at normal incidence is shown in FIG. 2. It is centered on $\lambda_0$=1550 nm. Being of Lorentzian type, it is quite different from the shape of an ideal filter, which would allow the entire bandwidth of the signal to pass through it and would cut off all of the rest. In this case, the ripple obtained is about 0.7 dB and the required −20 dB. The shape of the peak corresponding to an Airy function is therefore not satisfactory for the intended application.

SUMMARY OF THE INVENTION

The object of the invention is to solve this problem by proposing a filtering component using a Fabry-Perot cavity that can be used in an optical telecommunications network utilizing the technique of DWDM frequency-division multiplexing. The principle of the invention is based on the effect of multiplying two transfer functions of spectrally offset Fabry-Perot filters.

More precisely, the subject of the invention is a wavelength-selective optical filtering component, capable of transmitting light of a narrow optical spectral band centered around a given wavelength and capable of reflecting light having a wavelength outside said band, the transfer function of the component being defined by the multiplication of two transfer functions of spectrally offset Fabry-Perot filters, characterized in that the component includes a Fabry-Perot cavity, an input waveguide conveying light radiation into the cavity at a first angle of incidence, in order to make a first pass there through, and means for returning the light radiation that has passed through the cavity during the first pass in order to make a second pass through the cavity at a second angle of incidence, and in that the second angle of incidence differs from the first angle of incidence.

A filtering component according to the invention makes it possible to produce an optical filter whose transmission curve as a function of wavelength has a rectangular shape covering the narrow optical spectral band. A filter with such a shape is well known in the literature as being called a flat-top filter. The invention allows such a filter to be produced in a particularly simple and inexpensive manner.

BRIEF DESCRIPTION OF THE DRAWING

The invention will be better understood and further advantages will become apparent on reading the detailed description of one embodiment of the invention given by way of example, this description being illustrated by the appended drawing in which:

FIGS. 1 and 2 were described above so as to explain the

DETAILED DESCRIPTION OF THE INVENTION
problem solved by the invention.

According to the invention, an optical filtering component is produced whose transfer function is defined by the multiplication of two transfer functions for spectrally offset Fabry-Perot filters. The rest of the description presents one embodiment allowing this spectral offset to be obtained by using only a single Fabry-Perot cavity.

Figure 1:
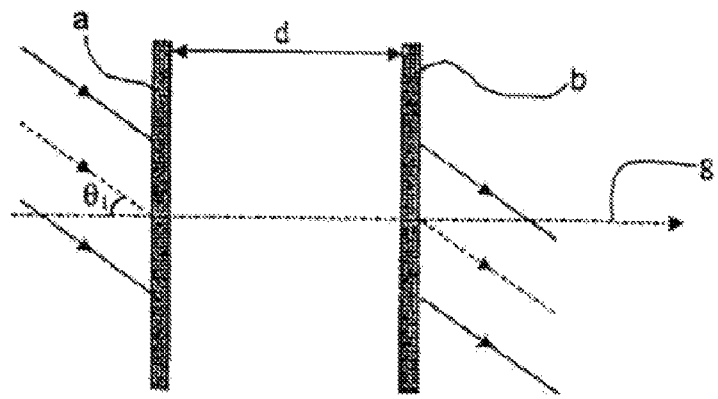
FIG. 1 shows a Fabry-Perot cavity illuminated by radiation at an angle of incidence θ to the direction normal to the mirrors of the cavity.
Figure 2:
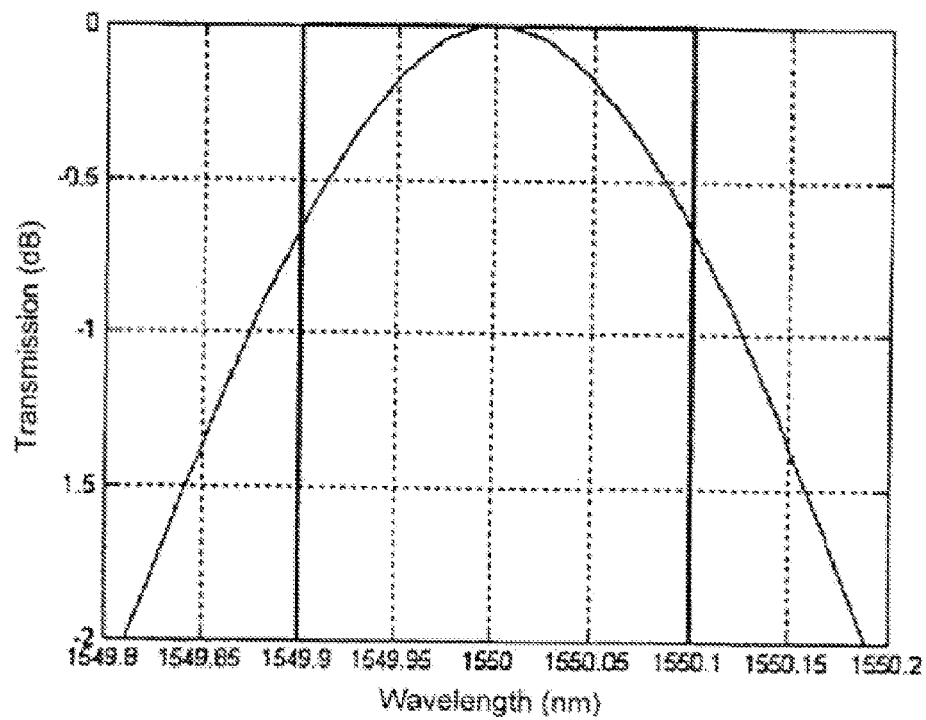
FIG. 2 shows the transmission curve of the cavity shown in FIG. 1 as a function of wavelength.
Figure 3:
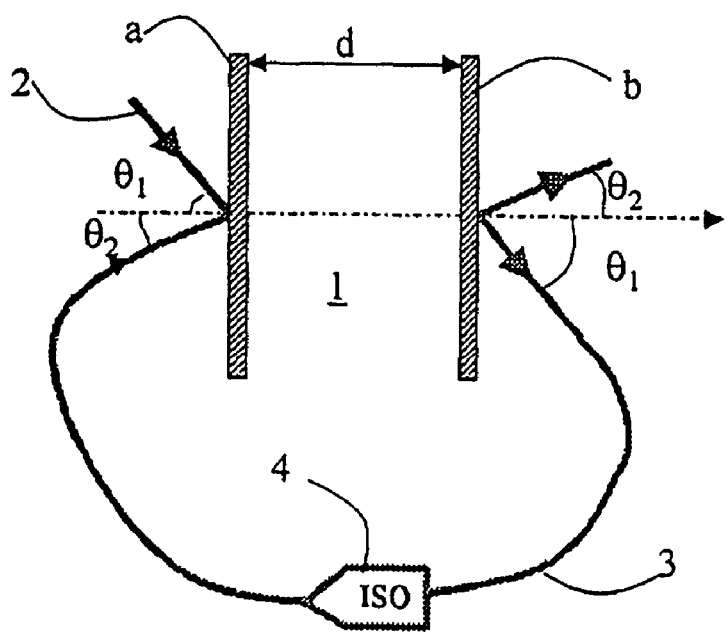
FIG. 3 shows schematically the optical path of radiation passing through an optical component according to the invention.

Referring to FIG. 3, the optical component comprises a Fabry-Perot cavity 1 bounded by two mirrors a and b, an input waveguide that conveys light radiation 2 into the cavity 1 at a first angle of incidence $\theta_1$ in order to make a first pass therethrough, means 3 for returning the light radiation that has passed through the cavity 1 during the first pass, in order to make a second pass through the cavity 1 at a second angle of incidence $\theta_2$. The second angle of incidence $\theta_2$ differs from the first angle of incidence $\theta_1$.

Advantageously, the return means include an optical isolator 4 so as to avoid any relatively highly coupled parasitic reflection in the return means 3. However, it should be noted that the fact of having two different angles of incidence $\theta_1$ and $\theta_2$ advantageously minimizes this parasitic reflection, the more so as the difference between the angles $\theta_1$ and $\theta_2$ increases.

Firstly, so as to better understand the invention, the effect of the angle of incidence on a cavity 1 will be developed below. From formula (1), the wavelength $\lambda(\theta)$ of the transmission peak obtained for an angle of incidence $\theta$ can be written as:

$$\lambda(\theta) = \lambda_0 \cos \theta \quad (2)$$

where $\lambda_0 = 2d/p$, $\lambda_0$ being the wavelength of the transmission peak for a zero angle of incidence $\theta_0$, p being the order of the cacity and d the distance between the two mirrors.

From formula (2) it may be deduced that when the angle of incidence $\theta$ increases, the transmission curve of the filter is offset toward shorter wavelengths. Consequently, by making two passes through the cavity 1 at different angles of incidence, the multiplication of two transfer functions of spectrally offset Fabry-Perot filter is indeed obtained.

More precisely, the transmissions denoted $T_1(\lambda)$ in the case of the first pass and $T_2(\lambda)$ in the case of the second pass may be determined from formula (2). These transmissions are centered on $\lambda_1$ and $\lambda_2$, respectively, such that:

$$\lambda_1 = \lambda_0 \cos \theta_1$$

$$\lambda_2 = \lambda_0 \cos \theta_2$$

where $\lambda_0 = 2d/p$ (p=order of the cavity).

The overall transmission, denoted $T_{1,2}(\lambda)$, for the two passes can then be expressed in the following manner:

$$T_{1,2}(\lambda) = \frac{1}{1 + M\sin^2\left(\frac{2\pi\, d\cos\theta_1}{\lambda}\right)} \times \frac{1}{1 + M\sin^2\left(\frac{2\pi\, d\cos\theta_2}{\lambda}\right)} \quad (3)$$

Figure 4:
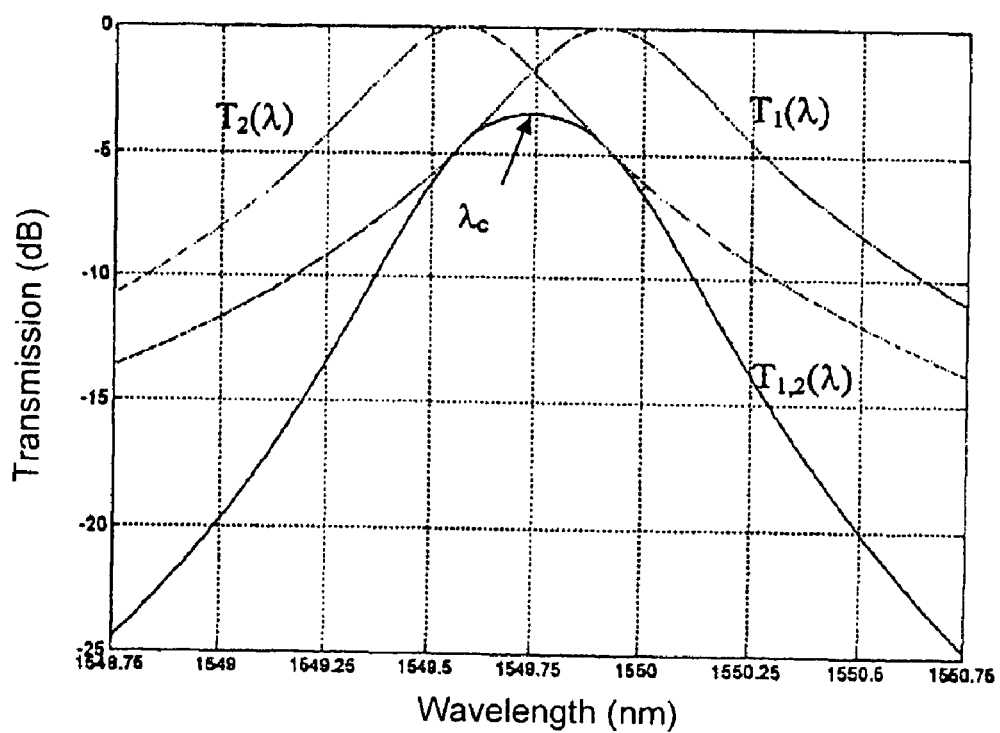
FIG. 4 shows a transmission curve of the optical component shown in FIG. 3.

An example of this overall transmission $T_{1,2}(\lambda)$ is shown in FIG. 4. The central wavelength $\lambda_c$ corresponds to the wavelength where $T_1(\lambda)$ and $T_2(\lambda)$ intersect.

When the difference between $\theta_1$ and $\theta_2$ decreases, the curves come closer together and the value of $T_{1,2}(\lambda)$ for the central wavelength increases, coming closer to that of the maxima for each transmission $T_1(\lambda)$ and $T_2(\lambda)$. For a given Fabry-Perot cavity (given order and given reflection coefficient), the two angles of incidence $\theta_1$ and $\theta_2$ are chosen so as to obtain a substantially flat response $T_{1,2}(\lambda)$ in a transmission channel so as to obtain a curve whose shape approaches as far as possible a rectangle.

Advantageously, the component includes a lens 7 for focusing light radiation into the cavity 1. The first light radiation leaves the input waveguide in the direction of the lens 7 and the second light radiation leaves the return means in the direction of the lens 7. The first light radiation and the second light radiation are approximately parallel to the optical axis 8 of the lens 7 and are offset transversely from the optical axis 8 of the lens 7. The offset of the first light radiation is different from the offset of the second light radiation. This difference allows the different angles of incidence $\theta_1$ and $\theta_2$ to be obtained.

Figure 5:
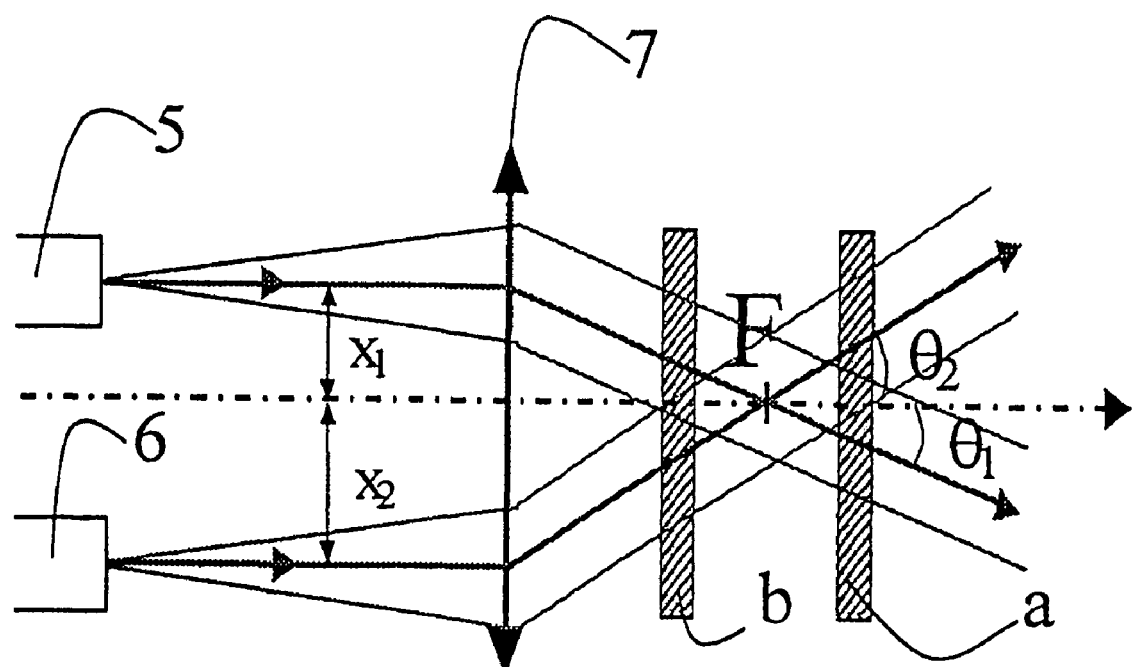
FIG. 5 shows an illustrative example of part of an optical component shown in FIG. 3.

More precisely, FIG. 5 shows one embodiment allowing input waveguides 5 and 6 to be produced, each conveying radiation into the cavity 1. The waveguide 5 is used for making the first pass through the cavity 1 at an angle of incidence $\theta_1$ and the waveguide 6 is used to make the second pass through the cavity 1 at an angle of incidence $\theta_2$. It is known how to produce waveguides for wavelengths of the order of 1500 nm, which wavelengths are very suitable for optical fibers, by photolithographic means on a sheet of glass or silicon, which means ensure positioning precision better than one micron and ion exchange in order to locally modify the refractive index. Other techniques are conceivable for producing the waveguiudes 5 and 6. For example, two optical fibres may be polished longitudinally so as to adjust the distance separating their cores.

The angles of incidence $\theta_1$ and $\theta_2$ are obtained, in the embodiment shown in FIG. 5, by transversely offsetting the waveguides 5 and 6 by $x_1$ and $x_2$ in front of the optical focusing means 7 of focal length f. The offset is made transversely with respect to the optical axis 8 of the optical focusing means 7. The optical focusing means 7 are positioned relative to the cavity 1 in such a way that the focus F of the optical focusing means 7 is located substantially at the center of the cavity 1. The transverse offset may be obtained with great precision (of the order of one hundred nanometers) thanks to "planar optics" or "guided" technology for example.

When the angles $\theta_1$ and $\theta_2$ are small, their tangents may be approximated to the angles themselves. Therefore:

$$\theta_1 + \theta_2 = \frac{x_1 + x_2}{f} \quad (4)$$

To achieve a better than 70 dB isolation between waveguides, the minimum value of $(x_1 + x_2)$ is about five times the waist radius of the light beam transported by the waveguide, i.e. 25 μm in the case of planar waveguides of 5 μm waist radius.

It should be noted that, given the small transverse offset required (around 20 to 30 μm) the field aberrations of the lens 7 (having a focal length of the order of 1 mm) are negligible.

The operating principle described here demands precision in the angles of incidence $\theta_1$ and $\theta_2$. It is therefore necessary to quantify the uncertainty in the angles of incidence $\theta_1$ and $\theta_2$ in a practical manner. To do this, we consider the following:

a lens of 1 mm focal length with an uncertainty in the focal distance $\Delta f/f$ associated with the production of the lens of 2%;

a transverse distance $x_1$ of 18 μm, in order to obtain approximately one angle of incidence $\theta_1$ of the order of 1° of the waveguide 5 with a positioning precision of 0.1 μm.

From equation (4), for a single waveguide, the uncertainty in the angle of incidence is:

$$\frac{\Delta\theta}{\theta} = \frac{\Delta x}{x} + \frac{\Delta f}{f} = \frac{0.1}{18} + 0.02$$

i.e. $\Delta\theta = 0.026° \cong 0.03°$.

In addition, it has been found that the higher the angle of incidence $\theta$, the greater the influence of the variation in angle of incidence within a given tolerance interval on the quality of the optical component. For example, for an angle of incidence of more than 2°, the variation in bandwidth at −0.5 dB becomes greater than 0.1 nm (for an intended 0.2 nm) when the angles of incidence vary by 0.03°, whereas for a 1° angle of incidence, the variation in bandwidth at −0.5 dB then becomes less than 0.05 nm.

Another parameter is to be taken into account for implementing the invention. This is the waist radius of the light beam leaving the waveguides 5 and 6. This is because it has been found that the smaller the beam waist radius, the more the transmission losses increase at a given angle of incidence. Furthermore, the more the beam waist radius decreases, the more the transmission peak of the filter is spectrally offset toward the shorter wavelengths, and it is therefore necessary to take this offset into account when designing the optical component.

The tendency is therefore to limit the angles of incidence $\theta_1$ and $\theta_2$ (this has already been found with regard to the tolerances on the angles of incidence) but also to maximize the waist radius of the beams output by the waveguides 5 and 6.

It should be noted that this provides an alternative embodiment, since the spectral offset obtained by difference in angle of incidence on the cavity may also be obtained by modifying the waist radius. However, this effect causes intrinsic degradation of the losses introduced, which go with the spectral offset.

The influence of the polarization of the beams output by the waveguides 5 and 6 on the characteristics of the optical component has also been studied. In one illustrative example ($R_a = R_b = 0.996$; order p=4; $\lambda_0 = 1550$ nm; $\theta_1 = 0.6°$ and $\theta_2 = 1.35°$), the measured influence of the polarization was around 0.05 nm over the bandwidth at −0.5 dB. This influence is quite acceptable for an application in optical telecommunications. The performance of the optical component is not substantially altered by any particular polarization of the beams.

The influence of the insertion losses between the two passes through the cavity 1 has also been studied. Here again even with high losses, for example 3 dB between the two passes, no influence has been observed on the bandwidth at −0.5 dB. Moreover, the rejection of the component was improved by 3 dB. The performance of the optical component is therefore not altered by insertion losses between the two passes through the cavity 1.

Advantageously, the optical component can be tuned. More precisely, it includes means for adjusting its central wavelength $\lambda_c$. These means are, for example, produced by electrostatically charging the two mirrors a and b of the cavity 1. By modifying the electrical voltage applied between the two mirrors, the forces generated by the charges are modified, and this has the consequence of modifying the length d of the cavity and therefore the wavelength $\lambda_c$.

The invention claimed is:

1. A wavelength-selective optical filtering component, capable of transmitting light of a narrow optical spectral band centered around a given wavelength ($\lambda_c$) and capable of reflecting light having a wavelength outside said band, comprising:
    an optical filtering component including a Fabry-Perot cavity;
    an input waveguide conveying light radiation into the cavity at a first angle of incidence ($\theta_1$), in order to make a first pass therethrough; and
    means for returning the light radiation that has passed through the cavity during the first pass in order to make a second pass through the cavity at a second angle of incidence ($\theta_2$), and in that the second angle of incidence ($\theta_2$) differs from the first angle of incidence ($\theta_1$);
    wherein the transfer function ($T_{1,2}(\lambda)$) of the component is defined by the multiplication of two transfer functions of spectrally offset Fabry-Perot filters.

2. The optical filtering component as claimed in claim 1, wherein the return means include an optical isolator.

3. The optical filtering component as claimed in claim 2, wherein the component includes a lens for focusing light radiation into the cavity, in that first light radiation leave the input waveguide in the direction of the lens, in that second light radiation leaves the return means in the direction of the lens, in that the first light radiation and the second light radiation are approximately parallel to the optical axis of the lens and are offset transversely from the optical axis of the lens, and in that the offset ($x_1$) of the first light radiation is different from the offset ($x_2$) of the second light radiation.

4. The optical filtering component as claimed in claim 2, wherein the optical component is tunable.

5. The optical filtering component as claimed in claim 1, wherein the component includes a lens for focusing light radiation into the cavity, in that first light radiation leaves the input waveguide in the direction of the lens, in that second light radiation leaves the return means in the direction of the lens, in that the first light radiation and the second light radiation are approximately parallel to the optical axis of the lens and are offset transversely from the optical axis of the lens, and in that the offset ($x_1$) of the first light radiation is different from the offset ($x_2$) of the second light radiation.

6. The optical filtering component as claimed in claim 3, wherein the optical component is tunable.

7. The optical filtering component as claimed in claim 1, wherein the optical component is tunable.

* * * * *